I. O. WILSON.
RESILIENT TIRE.
APPLICATION FILED OCT. 5, 1908.

964,727.

Patented July 19, 1910.

Witnesses

Inventor
Isaiah O Wilson
By
Harry A Brooks
Attorney

UNITED STATES PATENT OFFICE.

ISAIAH O. WILSON, OF EL TORO, CALIFORNIA.

RESILIENT TIRE.

964,727.

Specification of Letters Patent. Patented July 19, 1910.

Application filed October 5, 1908. Serial No. 456,352.

*To all whom it may concern:*

Be it known that I, ISAIAH O. WILSON, a citizen of the United States of America, residing at El Toro, in the county of Orange, State of California, have invented a certain new and useful Resilient Tire; and I do hereby declare the following to be a full, clear, and exact description of the invention, such as will enable others skilled in the art to which it appertains to make and use the same.

This invention relates to vehicle tires and more particularly to those of a resilient or yielding nature.

One object of the invention is the production of a light, simple, noiseless, durable, easily repaired and cheaply constructed article of this character.

Another object is to provide a tire that will not be disabled by being punctured.

Other objects and advantages of the invention will be apparent to those skilled in the art upon consideration of the following description of one form of construction wherein the invention may be embodied, reference being had to the accompanying drawing in which—

Figure 1:
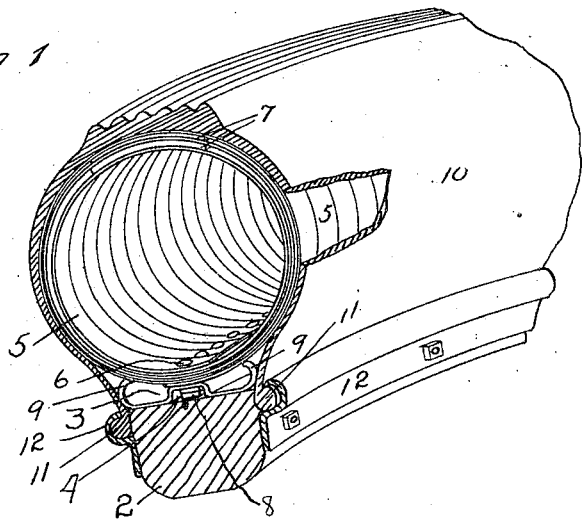
Figure 2:
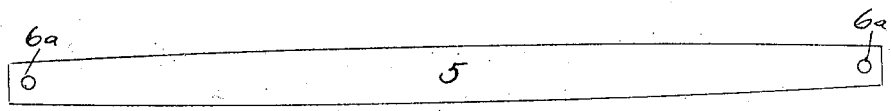

Figure 1 is a perspective view of a portion of a tire attached to the felly of a wheel, and Fig. 2 is a view showing one of the resilient members of the tire flattened out.

The felly 2 of the wheel has attached thereto by any suitable means (not shown) a rim 3, preferably of steel, the middle portion of which is provided with a raised portion constituting a hollow annular rib 4. The part 4 is perforated with a series of holes at intervals. A plurality of members, comprising strips 5 of steel or other resilient metal are bent into a substantially circular form, and through holes 6ª in their ends, bolts 6 are passed. It is contemplated that two or more of strips 5 are assembled concentrically, except in the case of tires for vehicles carrying very light loads. Pieces of fabric 7 impregnated with lubricant are inserted between the concentrically arranged strips 5, and the latter are then assembled on the rim by passing bolts 6 through the holes in their ends and securing the same by means of nuts 8. The sides of rim 3 are formed with a rounded flange 9 against which the outer strips 5 bear. A casing 10 is secured around the resilient members of the tires by any suitable means as by ribs 11 on its edges, which may be held by rings 12 bolted to felly 2.

I claim:

1. In a resilient tire, the combination of a felly, a metallic rim applied thereto and provided at its two edges with outwardly extending flanges, the middle portion of the rim being pressed outwardly to form a hollow annular rib, a plurality of resilient strips each of which is bent into a substantially circular form and the two ends thereof caused to overlap, bolts securing the overlapping ends of the said strips to the before mentioned annular rib and holding the strips against the outwardly extending flanges at the edges of the rim, nuts applied to the bolts and received within the hollow rib of the rim, and an outer casing inclosing the resilient strips and secured to the felly.

2. In a resilient tire, the combination of a felly, a metallic rim applied thereto and provided at its two edges with outwardly extending flanges, the middle portion of the rim being raised, a series of resilient strips bent into substantially circular form with the ends thereof overlapping, and a second series of resilient strips also bent into a substantially circular form with the ends thereof overlapping and arranged within the first mentioned series of strips, a lubricated fabric interposed between the two series of resilient strips at the tread side, fastening members securing the overlapping ends of the resilient strips to the raised portion of the rim and holding the said strips in engagement with the outwardly extending flanges at the edge of the rim, and an outer casing inclosing the resilient strips and secured to the felly.

In testimony whereof, I have signed my name to this specification in the presence of two subscribing witnesses at Los Angeles county of Los Angeles, State of California, this 23rd day of September A. D. 1908.

ISAIAH O. WILSON.

Witnesses:
ANNA B. DESSAU,
ALEX. H. LIDDERS.